US010205249B2

(12) United States Patent
Owen et al.

(10) Patent No.: US 10,205,249 B2
(45) Date of Patent: Feb. 12, 2019

(54) DIVERSIFIED ANTENNA SYSTEM FOR VEHICLE-TO-VEHICLE OR VEHICLE-TO-INFRASTRUCTURE COMMUNICATION

(71) Applicant: CONTINENTAL AUTOMOTIVE GMBH, Hannover (DE)

(72) Inventors: Richard Owen, Regensburg (DE); Christian Morhart, Obertraubling (DE)

(73) Assignee: Continental Automotive GmbH, Hannover (DE)

(*) Notice: Subject to any disclaimer, the term of this patent is extended or adjusted under 35 U.S.C. 154(b) by 385 days.

(21) Appl. No.: 14/747,049

(22) Filed: Jun. 23, 2015

(65) Prior Publication Data

US 2015/0380807 A1 Dec. 31, 2015

(30) Foreign Application Priority Data

Jun. 27, 2014 (DE) ........................ 10 2014 212 505

(51) Int. Cl.
*H01Q 21/29* (2006.01)
*H04B 7/08* (2006.01)
*H01Q 21/00* (2006.01)

(52) U.S. Cl.
CPC .......... *H01Q 21/29* (2013.01); *H04B 7/0842* (2013.01)

(58) Field of Classification Search
CPC .......... H01Q 21/29; H01Q 21/28; H01Q 1/27; H04B 7/0842; H04B 7/2606; H04B 7/0857; H04B 7/145; G01S 13/87; G01S 13/74; H03F 1/04

USPC .................................................. 343/725–728
See application file for complete search history.

(56) References Cited

U.S. PATENT DOCUMENTS

| | | | | |
|---|---|---|---|---|
| 2,297,925 A | * | 10/1942 | Usselman | H03F 1/04 |
| 3,049,711 A | * | 8/1962 | Hooper | H01Q 1/27 |
| 5,008,678 A | * | 4/1991 | Herman | G01S 13/87 |
| 5,767,793 A | * | 6/1998 | Agravante et al. | G01S 13/87 |
| 5,872,548 A | * | 2/1999 | Lopez | H01Q 21/28 |
| 5,999,092 A | * | 12/1999 | Smith et al. | G01S 13/87 |
| 6,115,591 A | * | 9/2000 | Hwang | H04B 7/0857 |
| 6,121,938 A | * | 9/2000 | Longshore et al. | G04B 7/145 |
| 2008/0111741 A1 | * | 5/2008 | Lee et al. | H01Q 21/28 |
| 2009/0167514 A1 | * | 7/2009 | Lickfelt | G01S 13/87 |
| 2013/0210366 A1 | | 8/2013 | Hansen et al. | |

FOREIGN PATENT DOCUMENTS

| | | | | | |
|---|---|---|---|---|---|
| DE | 102010003646 A1 | | 10/2011 | | |
| GB | 2390955 A | * | 1/2004 | .......... | H04B 7/2606 |
| JP | 11-110686 A | * | 4/1999 | ............ | G01S 13/74 |

* cited by examiner

*Primary Examiner* — Bernarr E Gregory
(74) *Attorney, Agent, or Firm* — Laurence A. Greenberg; Werner H. Stemer; Ralph E. Locher

(57) ABSTRACT

A diversified antenna system is suitable for vehicle-to-vehicle or vehicle-to-infrastructure communication. The antenna system has a first antenna arrangement and a directional antenna arrangement. The first antenna arrangement has a blind spot from which it cannot receive a signal. The directional antenna arrangement is configured to receive signals from the blind spot of the first antenna arrangement. A vehicle is provided with such an antenna system and communication is effected between vehicles or between vehicles and infrastructures.

14 Claims, 3 Drawing Sheets

DIVERSIFIED ANTENNA SYSTEM FOR VEHICLE-TO-VEHICLE OR VEHICLE-TO-INFRASTRUCTURE COMMUNICATION

CROSS-REFERENCE TO RELATED APPLICATION

This application claims the priority, under 35 U.S.C. § 119, of German patent application DE 10 2014 212 505.7, filed Jun. 27, 2014; the prior application is herewith incorporated by reference in its entirety.

BACKGROUND OF THE INVENTION

Field of the Invention

The present invention relates to a diversified antenna system for vehicle-to-vehicle or vehicle-to-infrastructure communication. In addition, the invention relates to a vehicle having such an antenna system and to a method of communicating between vehicles or between vehicles and infrastructures.

Vehicle-to-X communication (vehicle-to-vehicle or vehicle-to-infrastructure communication) is becoming increasingly important. Such communication paths are used by vehicles to send information, for example about speed, position and warning messages, to other subscribers or infrastructure devices, such as traffic lights or guidance systems.

For data interchange between the vehicles and the infrastructures, the signal transmission quality of the radio frequency communication is important, but can be adversely influenced by barriers in the signal path. Difficulties can additionally arise as a result of metal bodywork parts.

SUMMARY OF THE INVENTION

Against this background it is accordingly an object of the invention to provide a diversified antenna system which overcomes the above-mentioned and other disadvantages of the heretofore-known devices and methods of this general type and which provides good signal quality given simple design.

With the foregoing and other objects in view there is provided, in accordance with the invention, a diversified antenna system for vehicle-to-infrastructure or vehicle-to-vehicle communication, the antenna system comprising:

a first antenna arrangement for sending and/or receiving signals;

a second antenna arrangement, being a directional antenna arrangement;

the first antenna arrangement having a blind spot from which the first antenna arrangement cannot receive a signal, and the directional antenna arrangement being configured to send and/or receive signals from the blind spot of the first antenna arrangement.

In other words, the objects of the invention are achieved by a diversified antenna system for vehicle-to-infrastructure or vehicle-to-vehicle communication which has a first antenna arrangement and a directional antenna arrangement. The first first antenna arrangement is designed to send and/or receive signals to and/or from other vehicles and infrastructure devices. The first antenna arrangement has a blind spot (also referred to as a blind cone or blind region) from which it cannot receive a signal and in which it cannot send a signal, wherein the directional antenna arrangement is designed to send and/or receive signals to and/or from the blind spot of the first antenna arrangement.

By way of example, the first antenna arrangement may have one or more omnidirectional antennas and/or directional antennas. The blind spot or cone is that spatial region in which the first antenna arrangement cannot send and/or receive the signals, or can send and/or receive said signals only to a restricted degree, for example because this region is concealed, that is to say shaded, by the vehicle as seen from the first antenna arrangement.

The directional antenna arrangement is designed, and arranged following installation, such that it can send and/or receive the signals to/from the blind spot. When required, a directional antenna arrangement may have one or more directional antennas that have the same or different directional characteristics. This is significant particularly when design specifications, on the one hand, and aerodynamic considerations of the design, on the other hand, mean that the blind spot of the first antenna arrangement cannot be covered by just one directional antenna. Depending on the instance of application, the beam angle of a directional antenna may be up to approximately 180°, and subsequently the beam angle will be considered to be the angular range within which the relative antenna gain has fallen by no more than 3 dB in comparison with the main beam direction. Alternative interpretations are a definition of the beam angle as a 1 dB or 10 dB fall in the antenna gain in relation to the maximum value.

According to one exemplary embodiment of the invention, the first antenna arrangement is disposed at a spacing distance, or interval, from the directional antenna arrangement that is greater than a multiple of the wavelength of the signals that are to be sent and/or to be received by the antenna system.

The spacing distance chosen between the first antenna arrangement and the directional antenna arrangement can be a distance that is as large as possible. By way of example, the distance may be between a few centimeters and the complete vehicle length. If the directional antenna arrangement or the first antenna arrangement has two or more antennas, provision may also be made for a maximum possible distance between the directional antennas to be chosen. This allows reception and/or transmission of a signal that is as complete as possible, covering the entire angular range of 360°.

According to one exemplary embodiment of the invention, the directional antenna arrangement has a transmission and/or reception region, wherein the transmission region and/or the reception region of the directional antenna arrangement essentially corresponds to a magnitude of the blind spot of the first antenna arrangement, and a combination of the antenna pattern of the first antenna arrangement with the antenna pattern of the directional antenna arrangement results in an omnidirectional antenna pattern.

The antenna pattern, also referred to as a radiation pattern, is the graphical representation of a section through the directional characteristic that passes through the origin and the radiation maximum. Whereas an omnidirectional antenna has the most uniform possible radiation in all directions within a plane, a directional antenna produces a concentration of the radiation in a preferential direction.

The directional antenna arrangement should be arranged such that the transmission and/or reception region of the directional antenna arrangement substantially corresponds to a magnitude of the blind spot of the first antenna arrangement. In other words, the radiation field of the directional antenna arrangement should firstly cover the blind spot of the first antenna arrangement and also overlay the radiation field of the first antenna arrangement as little as possible.

Overlaying of the radiation fields of the directional antenna arrangement and the first antenna arrangement can result both in constructive and destructive overlays. Destructive overlays may require the signal quality to be restored by way of a complicated procedure.

Greater spacing distances between antennas can result in greater overlays.

The smallest possible overlays for radiation fields can reduce impairment of the signal quality. In addition, covering the blind spot of the first antenna arrangement allows an omnidirectional antenna pattern to be produced. In other words, the antenna system can send and/or receive the signals in all directions.

If the directional antenna arrangement has two or more directional antennas, the radiation fields of the directional antennas should cover the entire blind spot of the first antenna arrangement, and secondly the overlays between the radiation fields of the directional antennas should be as small as possible. This allows a signal that is as free of interference as possible to be received.

According to one exemplary embodiment of the invention, the antenna system has a combiner for merging the signals that have been received by the first antenna arrangement and the directional antenna arrangement, wherein the combiner is connected directly to the first antenna arrangement and the directional antenna arrangement.

The combiner is used to merge (combine) the signals of the same frequency that are received by the directional antenna arrangement and the first antenna arrangement to form a stronger signal. Combination of the signals does not require the use of phase shifters. The phase shifters are used to delay signals received by one antenna with respect to the signals received by another antenna, so that the probability of destructive interference between the signals of the two antennas can be substantially reduced. This applies particularly when a plurality of antennas are arranged in a vehicle, for example, particularly when these antennas are situated close to one another. The use of phase shifters increases the complexity of the antenna system and the costs thereof, however.

Other measures for restoring the signal quality reduced by interference are not required either. Examples of these are maximum ratio combining, which involves the signals received by both antenna arrangements being added in weighted fashion by means of analog or digital signal processing, or switching diversity, which involves the antenna arrangement with the highest reception power being used.

This allows a reduction in the complexity of the antenna system for vehicle-to-vehicle or vehicle-to-infrastructure communication. In addition, an omnidirectional antenna pattern can be produced by combining the signals received by both antenna arrangements.

According to one exemplary embodiment of the invention, the antenna system uses a solitary receiver in the form of a single channel receiver.

A dual channel diversity receiver is not required. The single channel receiver of simple design allows a reduction in the complexity and also lowering of the cost of the antenna system.

According to one exemplary embodiment of the invention, the first antenna arrangement and the directional antenna arrangement are designed for a frequency of between 0.5 GHz and 11 GHz, particularly of 5.9 GHz.

This frequency range is enabled for mobile radio and is already used by vehicles today, e.g. for navigation systems and wireless networks. For vehicle-to-vehicle or vehicle-to-infrastructure communication, a frequency of 5.9 GHz, for example, is provided, which corresponds to the frequency band of the automotive WLAN (Wireless Local Area Network) system. The antenna system may also be designed for another frequency range, e.g. the LTE (Long Term Evolution) mobile radio frequency range, which lies between 800 MHz and 2.6 GHz.

According to one exemplary embodiment of the invention, the first antenna arrangement is at an spacing distance from the directional antenna arrangement that is greater than ten times the wavelength of the signals that are to be sent by the antenna system.

According to one exemplary embodiment of the invention, the first antenna arrangement is an omnidirectional antenna.

With the above and other objects in view there is also provided, in accordance with the invention, a vehicle that is equipped with a diversified antenna system as described above and below.

According to one exemplary embodiment of the invention, the first antenna arrangement and the directional antenna arrangement are arranged in the vehicle and/or outside on the vehicle.

By way of example, depending on design specifications and aerodynamic considerations for the design of the vehicle, the first antenna arrangement can be mounted in the vehicle and/or outside on the vehicle, for example on the roof, on or in a windshield or rear window, in the front spoiler, in a bumper, in the tailgate, in the exterior mirrors or in the lights of a vehicle. The directional antenna arrangement is likewise arranged in the vehicle and/or outside on the vehicle for the purpose of sending and/or receiving the signals that are in the blind spot of the first antenna arrangement. If the first antenna arrangement is arranged on the roof or in the rear window of a vehicle, for example, the directional antenna arrangement can be arranged in the interior mirror, in the exterior mirrors or in the front spoiler. The arrangement of the antennas should result in an omnidirectional radiation characteristic covering 360° and in a reduction in the overlay between the radiation fields of both antenna arrangements.

With the above and other objects in view there is further provided, in accordance with the invention, a method for communication between vehicles or vehicles and infrastructures. The novel method has the following steps: production of an omnidirectional antenna pattern through combination of the antenna pattern of a first antenna arrangement with the antenna pattern of a directional antenna arrangement of a vehicle or of an infrastructure, wherein the transmission and/or reception region of the directional antenna arrangement essentially corresponds to a magnitude of the blind spot of the first antenna arrangement, and wherein the first antenna arrangement is at an interval from the directional antenna arrangement that is greater by a multiple than the wavelength of the signals that are to be sent by the antenna system.

It is noted that the embodiments of the invention that are described below relate to the antenna system, the vehicle and the method in equal measure.

Other features which are considered as characteristic for the invention are set forth in the appended claims. The individual features can naturally also be combined with one another, which to some extent can also result in advantageous effects that go beyond the sum of the individual effects.

Although the invention is illustrated and described herein as embodied in a diversified antenna system for vehicle-to-vehicle or vehicle-to-infrastructure communication, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF EXEMPLARY EMBODIMENTS

Figure 1:
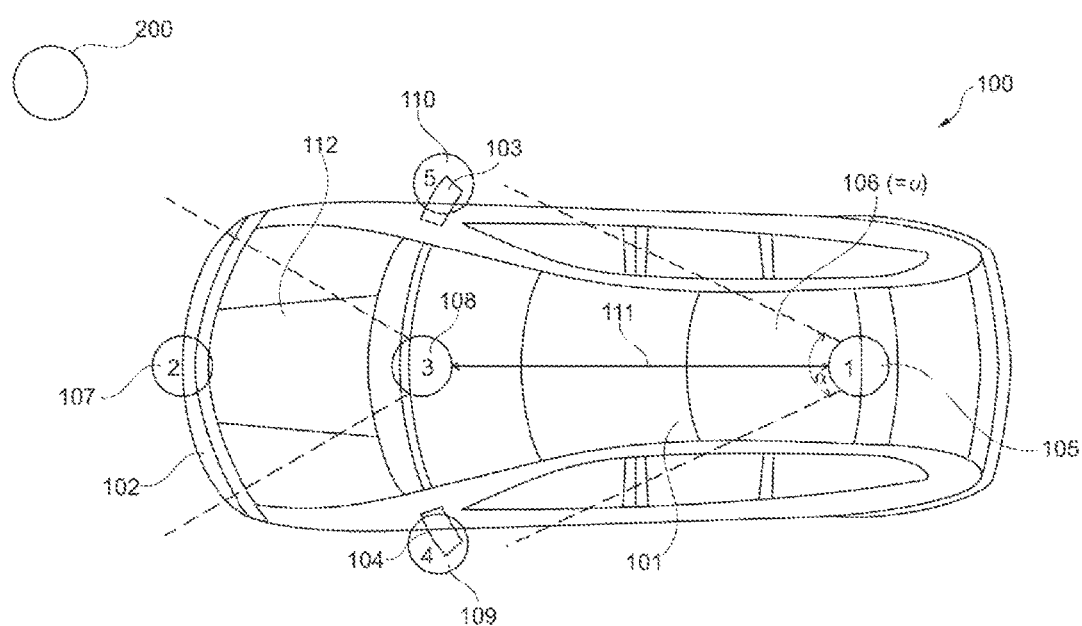
FIG. 1 is a plan view onto an exemplary embodiment of the first antenna arrangement and the directional antenna arrangement in a vehicle.

Referring now to the figures of the drawing in detail and first, particularly, to FIG. 1 thereof, there is shown an arrangement of a first antenna arrangement 105 and a directional antenna arrangement 107, 108, 109, 110 on a vehicle 100. In addition to other vehicles, the vehicle 100 can communicate for instance with an infrastructure device 200, referred to as infrastructure 200, for short. The first antenna arrangement, for example an omnidirectional antenna, is arranged in the rear roof region 101, also referred to as position 1, of the vehicle. In a blind spot 106, also referred to as a blind spot 106, the first antenna arrangement cannot receive the signal, or can receive the signal only inadequately, for example as a result of the geometry of the vehicle. The blind spot 106 is indicated by the angle α. By way of example, the angle α of the blind spot may be 60° or 90°. The directional antenna arrangement may be designed, by way of example, as a radiator grill antenna 107 in the front spoiler 102, a rear mirror antenna 108 in a rear view mirror, or as side mirror antennas 109, 110 in the exterior mirrors 103, 104, respectively, of the vehicle 100. These location points for the arrangement of the directional antenna arrangement are also referred to as positions 2, 3, 4 and 5, respectively. The points for arrangement of the directional antenna arrangement may differ depending on the number of directional antennas. If the directional antenna arrangement has a single directional antenna, for example, the directional antenna may be arranged in the rear mirror as a rear mirror antenna 108 or in the front spoiler 102 of the vehicle 100 as a radiator grill antenna 107. If the directional antenna arrangement has two directional antennas, the two directional antennas may be arranged in the exterior mirrors 103 and 104 as side mirror antennas 109, 110. In this case, the directional antenna arrangement is designed such that the radiation field of the directional antenna arrangement covers the blind spot 106 under the angle α.

Figure 2A:
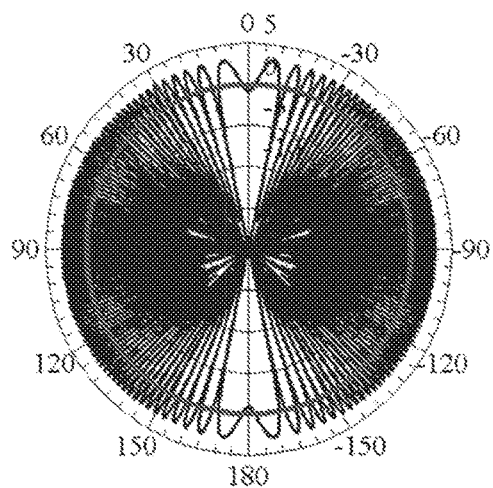
FIGS. 2A and 2B show two antenna patterns for a combination of two omnidirectional antennas.
Figure 2B:
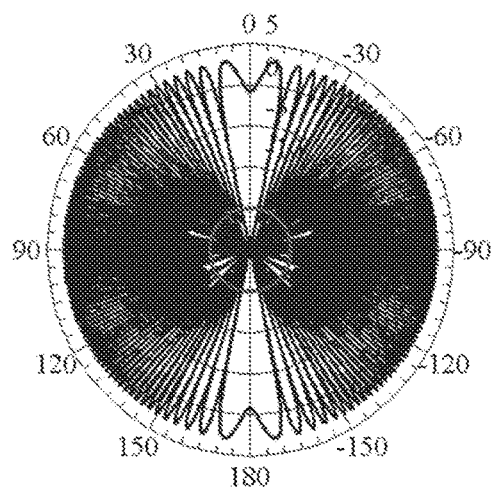

FIGS. 2A and 2B show two antenna patterns for a combination of the two omnidirectional antennas. A first omnidirectional antenna is arranged in the rear roof region of the vehicle. A second omnidirectional antenna is arranged in the front spoiler of the vehicle at a spacing distance 111 (i.e., an interval) of 2 meters from the first omnidirectional antenna for the purpose of sending and/or receiving from the blind spot of the first omnidirectional antenna. Both antennas operate in the frequency range around 5.9 GHz.

The overlay between the radiation patterns of both omnidirectional antennas result in a multiplicity of side lobes and two narrow main lobes with orientations that are each oriented 0° to the front and 180° to the rear. The destructive overlays occurring in a plurality of angular ranges between the radiation patterns additionally result in signal loss through to complete cancellation. In other words, the antenna system cannot receive the signals in these directions, or can receive them only at greatly reduced signal strength. The reason for this is that, inter alia, an omnidirectional antenna radiates uniformly in all directions within a plane, so that a high level of interference occurs, particularly in the angular ranges 10° to 170° and −170° to −10°. In other words, the installation of the second omnidirectional antenna has adversely influenced the radiation and reception procedure of the first omnidirectional antenna. A direct combination of the signals received by both omnidirectional antennas in these angular ranges results in impairment of the signal quality. One solution to this problem is to use a complicated procedure for sending and receiving signals. This increases the complexity of the vehicle antenna system, however.

Figure 3A:
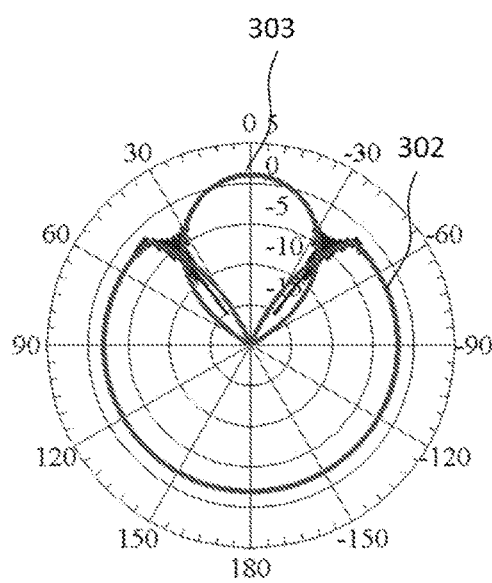
FIGS. 3A and 3B show a combination of two antenna patterns for a combination of an omnidirectional antenna and a directional antenna according to an exemplary embodiment of the present invention.
Figure 3B:
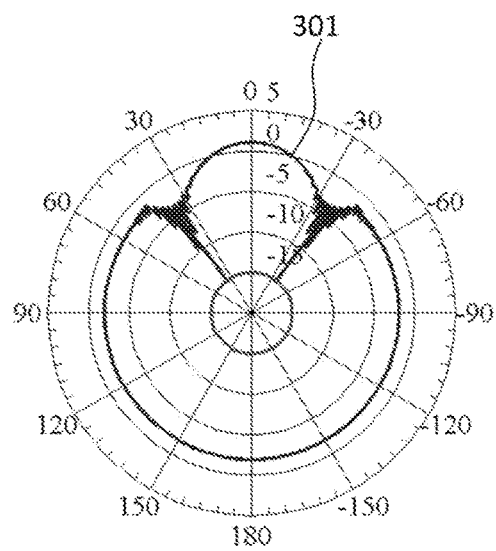

FIGS. 3A and 3B show two antenna patterns through the combination of an omnidirectional antenna and a directional antenna according to an exemplary embodiment of the present invention. As illustrated by FIG. 1, an omnidirectional antenna, i.e. a first antenna arrangement, is arranged in the rear roof region 101 of the vehicle 100, i.e. in the position 1. The omnidirectional antenna has a blind spot 106, that is to say a blind angular range a, of approximately 70°. In addition, a directional antenna, i.e. a directional antenna arrangement, is arranged in the front spoiler 102, i.e. in the position 2, at an interval of 2 meters from the omnidirectional antenna. Both antennas operate in the frequency range around 5.9 GHz.

The directional antenna radiates substantially in a forward direction, at a beam angle of approximately 40°. In this way, the signals emitted and/or signals received by the directional antenna and the omnidirectional antenna are overlaid just in two angular ranges between −40° and −30° and between 30° and 40°. With reference to FIG. 1, the overlaying takes place at the marginal regions of the blind angular range 106 of the omnidirectional antenna, the margins of the blind angular range 106 being indicated by dashed lines. In addition, a minimum gain of −15 dBi is achieved. Direct combination of the signals received by the omnidirectional antenna and by the directional antenna has no or little effect on the signal quality, apart from in the angular ranges −40° to −30° and 30° to 40°. These angular ranges can be reduced by using a directional antenna with a narrow beam angle, however. It is additionally possible for the overlay angular ranges to be provided by means of the arrangement of the antennas in the regions in which the drops in performance can be tolerated.

It is additionally possible for the blind spot of the first antenna arrangement to be covered by two directional antennas as a directional antenna arrangement. In this case, each of the two directional antennas can be integrated into a respective one of the two exterior mirrors, for example. Both directional antennas cover different, nonoverlapping angular ranges. The preferential directions and radiation or reception characteristics of the two directional antennas can be chosen such that the blind spot of the first antenna arrangement is covered.

Figure 4:
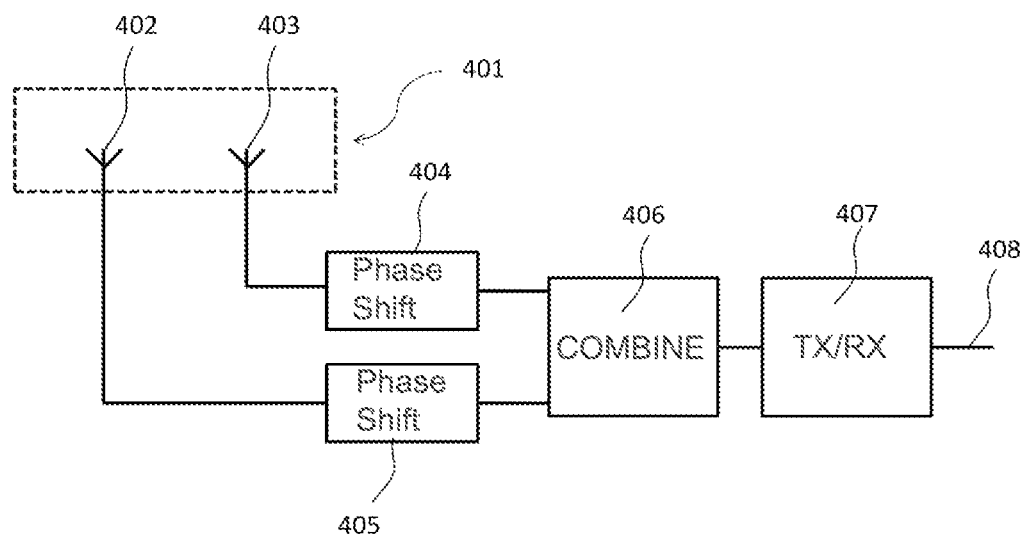
FIG. 4 is a diagrammatic view of a reception path for a diversified antenna system having two omnidirectional antennas.

FIG. 4 shows a reception path for a diversified antenna system 401 having two omnidirectional antennas 402, 403. The antenna system 401 has two phase shifters 404, 405, a combiner 406 and a transmission and reception apparatus 407. The combiner 406 merges a plurality of relatively weak signals at the same frequency to produce a relatively strong signal. The phase shifters 404, 405 are used to delay signals received by one antenna with respect to the signals received by the other antenna, so that the probability of destructive interference between the signals of the two antennas is substantially reduced. The delayed and undelayed signals are combined by the combiner 406 in order to produce a signal that is as free of interference as possible. The combination of 404, 405, 406 and 407 can also be designed as a dual channel receiver in the form of an integrated diversity receiver. As FIG. 2 shows, severe destructive overlays occur in a multiplicity of angular ranges. In order to restore the signal quality, the use of phase shifters and dual channel diversity receivers is necessary. This applies particularly when a plurality of omnidirectional antennas are situated physically close to one another, as in the case of a vehicle, for example.

Figure 5:
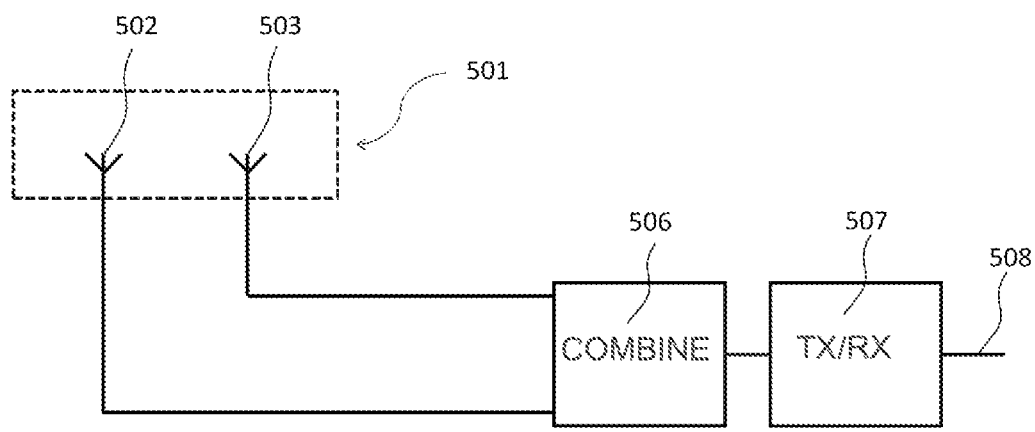
FIG. 5 is a diagrammatic view of a reception path for an antenna system according to an exemplary embodiment of the invention having a first antenna arrangement and a directional antenna arrangement according to an exemplary embodiment of the present invention.

FIG. 5 shows a reception path for an antenna system 501 according to an exemplary embodiment of the invention with a first antenna arrangement 502 and a directional antenna arrangement 503. The antenna system has a combiner 506 and a transmission and reception device 507. The transmission and reception device 507 has a single channel receiver. The signals received by the first antenna arrangement 502 and the directional antenna arrangement 503 are combined in a simple manner by a combiner 506 without the use of phase shifters 404, 405. The reason for this is that, inter alia, the interference between the radiation fields of both antenna arrangements is reduced by the directional antenna arrangement 503, as shown in FIG. 3. In the overlay angular ranges, the signal interference can be minimized through the use of a directional antenna having an appropriately narrow beam angle. It is additionally possible for the overlay angular ranges to be provided by the arrangement of the antennas in the regions in which the drops in performance can be tolerated.

It should be noted that the terms "having" and "comprising" do not exclude further elements or method steps, in the same way that the terms "a" and "an" do not exclude a plurality of elements and steps.

The following is a summary list of reference numerals and the corresponding structure used in the above description of the invention. It will be understood, of course, the reference symbols used in the claims are used merely to facilitate comprehension and are in no way intended to be regarded as restrictive.

100 Vehicle
101 Roof region
102 Front spoiler
103 Right-hand exterior mirror
104 Left-hand exterior mirror
105 Roof antenna
106 Blind spot, blind cone
107 Radiator grill antenna
108 Rear mirror antenna
109 Left-hand exterior mirror antenna
110 Right-hand exterior mirror antenna
111 Interval, spacing distance
112 Transmission/reception region
200 Infrastructure device, infrastructure
301 Antenna pattern for a combination of the omnidirectional antenna and the directional antenna
302 Antenna pattern for the omnidirectional antenna
303 Antenna pattern for the directional antenna
401 Antenna system
402 First omnidirectional antenna
403 Second omnidirectional antenna
404 First phase shifter
405 Second phase shifter
406 Combiner
407 Transmission and reception device
408 Digital data
501 Diversified antenna system
502 First antenna arrangement
503 Directional antenna arrangement
506 Combiner
507 Transmission and reception device
508 Digital data

The invention claimed is:

1. A diversified antenna system for vehicle-to-infrastructure or vehicle-to-vehicle communication, the antenna system comprising:
a first antenna arrangement for sending and/or receiving signals, said first antenna arrangement being an omnidirectional antenna;
a second antenna arrangement being a directional antenna arrangement; and
a combiner connected directly to said first antenna arrangement and to said directional antenna arrangement, and configured for merging signals received by said first antenna arrangement and said directional antenna arrangement;
said first antenna arrangement having a blind spot from which said first antenna arrangement cannot receive a signal, and said directional antenna arrangement being configured to send and/or receive signals from the blind spot of said first antenna arrangement; and
said second antenna disposed spaced away from said first antenna.

2. The antenna system according to claim 1, wherein said directional antenna arrangement has a transmission and/or reception region substantially corresponding to a magnitude of the blind spot of said first antenna arrangement, and a combination of an antenna pattern of said first antenna arrangement with an antenna pattern of said directional antenna arrangement results in an omnidirectional antenna pattern.

3. The antenna system according to claim 1, which comprises exactly one single channel receiver.

4. The antenna system according to claim 1, wherein said first antenna arrangement and said directional antenna arrangement are configured for a frequency of between 0.5 GHz and 11 GHz.

5. The antenna system according to claim 4, wherein said first antenna arrangement and said directional antenna arrangement are configured for an operating frequency of 5.9 GHz.

6. The antenna system according to claim 1, wherein said first antenna arrangement is disposed at a spacing distance from said directional antenna arrangement that is greater than ten times a wavelength of signals to be sent by the antenna system.

7. The antenna system according to claim 1, wherein said second antenna is disposed remotely from said first antenna.

8. The antenna system according to claim 1, wherein said second antenna is disposed nonadjacent from said first antenna.

9. A combination, comprising:
a vehicle; and
a diversified antenna system for vehicle-to-infrastructure or vehicle-to-vehicle communication, the antenna system including:
 a first antenna arrangement for sending and/or receiving signals, said first antenna arrangement being an omnidirectional antenna;
 a second antenna arrangement being a directional antenna arrangement;
 said first antenna arrangement having a blind spot from which said first antenna arrangement cannot receive a signal, and said directional antenna arrangement being configured to send and/or receive signals from the blind spot of said first antenna arrangement;
 said first antenna arrangement and said directional antenna arrangement disposed in said vehicle and/or on said vehicle; and
 said second antenna disposed spaced away from said first antenna.

10. The combination according to claim 9, wherein said second antenna is disposed remotely from said first antenna.

11. The combination according to claim 9, wherein said second antenna is disposed nonadjacent from said first antenna.

12. A method of communicating between vehicles or between vehicles and infrastructure devices, the method comprising:
providing a vehicle or an infrastructure device with a first antenna arrangement having a given antenna pattern and a directional antenna arrangement having an antenna pattern;
wherein the first antenna arrangement is an omnidirectional antenna;
wherein a transmission and/or reception region of the directional antenna arrangement is substantially equal to a magnitude of a blind spot of the first antenna arrangement; and
producing an omnidirectional antenna pattern by combining the given antenna pattern of the first antenna arrangement with the antenna pattern of the directional antenna arrangement of the vehicle or of the infrastructure device, wherein the directional antenna arrangement is disposed spaced away from the first antenna arrangement.

13. The method according to claim 12, wherein said second antenna is disposed remotely from said first antenna.

14. The method according to claim 12, wherein said second antenna is disposed nonadjacent from said first antenna.

* * * * *